United States Patent [19]
Willsey

[11] Patent Number: 4,764,387
[45] Date of Patent: Aug. 16, 1988

[54] ALBUMEN COLLECTION METHOD
[75] Inventor: Charles H. Willsey, Topeka, Kans.
[73] Assignee: Seymour Foods, Inc., Topeka, Kans.
[21] Appl. No.: 9,192
[22] Filed: Jan. 30, 1987
[51] Int. Cl.[4] ............................................. A23J 1/09
[52] U.S. Cl. ..................................... 426/299; 99/498; 99/582; 426/478
[58] Field of Search .................. 426/299, 478, 490; 99/495, 498, 472, 568, 582

[56] References Cited

U.S. PATENT DOCUMENTS

| | | | |
|---|---|---|---|
| 1,727,493 | 9/1929 | Tranin | 99/495 |
| 1,945,860 | 2/1934 | Laffler | 99/495 |
| 2,043,372 | 6/1936 | Droege | 426/518 |
| 2,206,959 | 7/1940 | Irish | 426/478 |
| 2,735,464 | 2/1956 | Kerven | 99/495 |
| 2,760,537 | 8/1956 | Willsey | 99/495 |
| 2,792,040 | 5/1957 | Willsey | 99/495 |
| 2,900,071 | 8/1959 | Willsey | 99/497 |
| 3,055,407 | 9/1962 | Conrad | 99/495 |
| 3,106,234 | 10/1963 | Conrad | 99/495 |
| 3,374,728 | 3/1968 | Owens | 99/497 |
| 3,470,925 | 10/1969 | Noren | 99/497 |
| 3,480,056 | 11/1969 | Willsey | 99/498 |
| 3,562,846 | 2/1971 | Creamer et al. | 15/353 |
| 3,605,786 | 9/1971 | Machin, Jr. | 137/205 |
| 3,854,394 | 12/1974 | Willsey | 99/495 |
| 4,182,234 | 1/1980 | Reed | 99/495 |
| 4,194,262 | 3/1980 | Finley et al. | 15/353 |
| 4,541,330 | 9/1985 | Fujimura | 99/497 |
| 4,605,562 | 8/1986 | Fujimura | 426/478 |

Primary Examiner—George Yeung
Attorney, Agent, or Firm—Litman, McMahon & Brown

[57] ABSTRACT

An apparatus for collecting albumen drippings or stringers from conveyor-mounted egg breaking and separating units. The apparatus includes a collection container with an exhaust opening connected to a vacuum pump, an albumen discharge opening and an albumen and air intake opening. A vacuum pickup head includes an opening positioned in the travel path of the egg breaking and separating units. The albumen drippings or stringers are drawn through the pickup head inlet opening and into the collection container. An exhaust valve assembly in the collection container closes the exhaust opening when the albumen reaches a predetermined full level, which releases the partial vacuum for discharging the albumen contents. A method of collecting albumen is disclosed and includes the steps of clamping an egg in a breaking and separating unit, cracking the eggshell, separating the eggshell into two parts, dumping the contents into a yolk cup, straining the albumen from the yolk and retaining the yolk in the yolk cup, overflowing the albumen from the yolk cup into an albumen cup, passing the breaking and separating unit by a vacuum pickup head, drawing albumen drippings and air through the pickup head and into a collection container, exhausting air from the collection container and releasing the albumen contents from the collection container when a predetermined albumen level is reached.

6 Claims, 3 Drawing Sheets

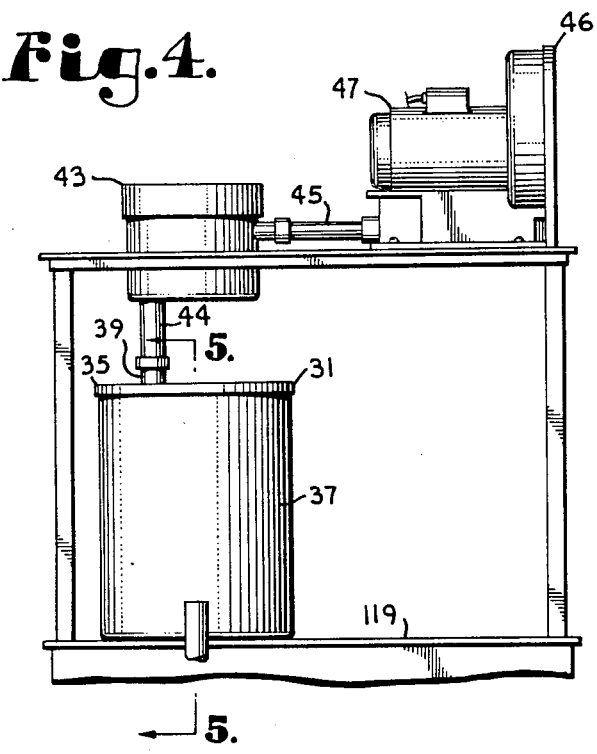
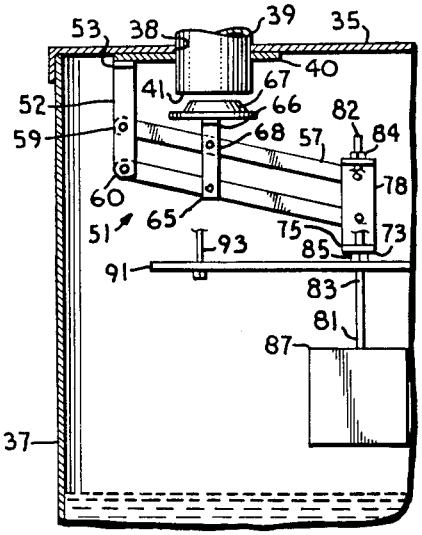
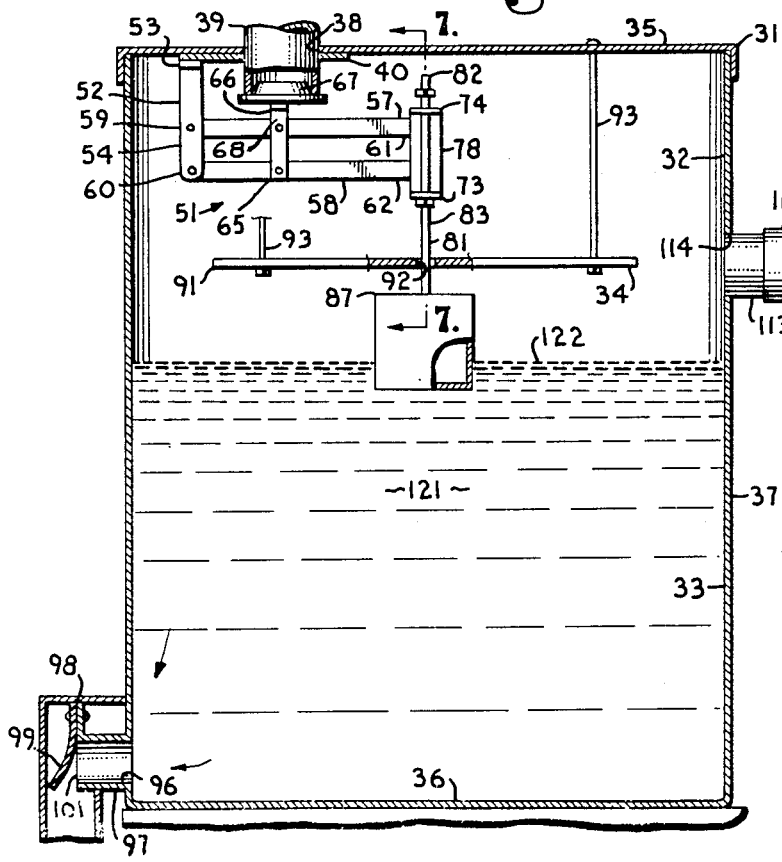
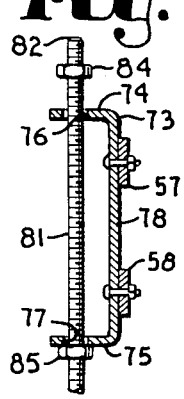
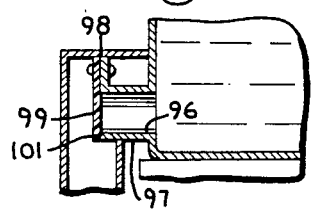

ALBUMEN COLLECTION METHOD

BACKGROUND OF THE INVENTION

1. Field of the Invention

The present invention relates generally to egg processing, and in particular to a method and apparatus for collecting albumen drippings on an egg processing machine.

2. Description of the Prior Art

The edible or "eggmeat" portion of an egg consists primarily of a yolk and a quantity of albumen, the latter being commonly referred to as "egg white" and surrounding the yolk in an eggshell. A large portion of the approximately 70 billion eggs produced in the United States each year is sold to consumers and the food service industry for use as whole eggs. However, there is also a vast demand for separated yolk and albumen products. For example, albumen (or ovalbumen) is used commercially in the leather industry, in foodstuffs, as a clarifying agent, in photography, in adhesives and in sugar refining. Since albumen has a much lower cholesterol content than egg yolk, it is often preferred as a food or a food ingredient by persons wishing to limit their cholesterol intake. Egg yolks are commonly used in baking, dairy products, mayonnaise, pharmaceuticals, soap and perfumery.

Egg processing machines have heretofore been proposed which automatically break the eggs, separate the albumen and yolk and collect the eggmeat products for distribution and resale. For example, the inventor's U.S. Pat. No. 2,900,071 discloses a mechanism for separating egg whites from egg yolks wherein multiple receptacles are mounted on an endless chain of a conveyor. The receptacles receive, separate and dump the egg contents at appropriate locations along the path of conveyor travel.

A machine for automatically receiving, retaining and breaking eggs is shown in the inventor's U.S. Pat. No. 2,792,040 and includes a rotary head or turret for holding successive eggs at a cracking station. The eggmeat contents are delivered from the breaking machine to conveyor-mounted separating devices.

An undesirable characteristic of albumen, at least for processing purposes, is that it is highly viscous and tends to cling to the eggshells and egg yolks. Egg processing tends to be highly competitive and relatively small improvements in efficiency can result in substantial profit gains. Hence, it is highly desirable to recover as much albumen as possible from each processed egg. To this end, prior art devices have been proposed for extracting the small amounts of albumen that cling to the broken eggshells after the yolk and most of the albumen are removed therefrom.

For example, the Laffler U.S. Pat. No. 1,945,860 discloses nozzles over which the eggshell halves are placed for receiving blasts of compressed air whereby the albumen is forced from the eggshell halves. Eggshell halves are also placed over nozzles in the apparatus disclosed in the Irish U.S. Pat. No. 2,206,959, wherein suction is used to extract the albumen for collection in a container which is connected to a vacuum pump.

Yet another solution to this problem is proposed in the inventor's U.S. Pat. No. 3,854,394 for an egg liquid extractor apparatus. The apparatus disclosed therein includes conveyor belts for crushing egg material therebetween. The liquid albumen squeezed from the egg material, which can include whole eggs, is separated from the larger pieces of eggshell, but it is generally not considered suitable for human consumption because of the presence of smaller eggshell fragments and the use of whole eggs which, for various reasons, have been deemed inedible by humans.

Some automatic egg processing machines rely on gravity to discharge and separate the eggmeat. In such machines, the eggshells are broken, the halves separated and the contents dumped into a yolk cup with a notch or opening which permits the albumen to overflow into an albumen cup. Because of the highly viscous nature of the albumen, the invariable drippings (often referred to as "stringers" in the industry) remain suspended from the eggshell halves and are usually discarded therewith. Hence, a certain amount of edible albumen is wasted with such prior art machines. Such a reliance on gravity is detrimental because modern egg processing machines process several hundred eggs per minute and allow relatively little time for albumen stringers to be collected by gravity. Furthermore, albumen is more viscous at lower temperatures and if the egg processing plant is unheated or the input eggs are relatively cold, gravity flow is impeded.

Heretofore there has not been available an albumen collection apparatus and method with the advantages and features of the present invention.

SUMMARY OF THE INVENTION

In the practice of the present invention, an apparatus for collecting albumen from a conveyor-mounted egg breaking and separating unit is provided which includes a collection container with an exhaust opening connected to a vacuum pump, an inlet opening and an albumen discharge opening. A vacuum pickup head including an intake slot aligned with the path of travel of the breaking and separating unit is connected to the intake opening by an intake hose. An exhaust valve assembly is provided in the collection container and includes a valve member adapted to selectively close the exhaust opening. The exhaust valve assembly is actuated by a float positioned in the collection container and closes when albumen reaches a predetermined full level in the collection container. A check valve is associated with the discharge opening and opens when the exhaust valve assembly closes. Conversely, when the exhaust valve assembly is open, the discharge valve is closed whereby albumen accumulates within the collection container. A method of collecting albumen is provided which includes the steps of clamping an egg in a breaking and separating unit, cracking the eggshell, separating the eggshell into two parts, dumping the contents into a yolk cup, straining the albumen from the yolk, retaining the yolk in the yolk cup, overflowing the albumen from the yolk cup into an albumen cup, passing the breaking and separating unit by a vacuum pickup head, drawing albumen drippings and air through the pickup head and into a collection container, exhausting air from the collection container and releasing the albumen contents from the collection container when a predetermined albumen level is reached.

OBJECTS OF THE INVENTION

The principal objects of the present invention are: to provide an apparatus for collecting albumen drippings from conveyor-mounted egg breaking and separating units; to provide such an apparatus which utilizes a vacuum pump for drawing air and albumen drippings into a collection container; to provide such an apparatus which maximizes the collection and recovery of albumen from processed eggs; to provide such an apparatus which is particularly well adapted for use with modern, high-speed egg processing equipment; to provide such an apparatus which is adapted for automatically dispensing the contents of the collection container upon reaching a predetermined full level of albumen; to provide such an apparatus which may be retrofitted on many existing egg processing machines; and to provide such an apparatus which is economical to manufacture, efficient in operation and particularly well adapted for the proposed usage thereof; to provide a method of recovering albumen from conveyor-mounted egg breaking and separating units; to provide such a method wherein a vacuum pickup head is provided in the path of the breaking and separating units; to provide such a method wherein albumen drippings from the breaking and separating units are drawn into the vacuum pickup head; to provide such a method wherein the albumin drippings are collected in a collection chamber; to provide such a method wherein the collected albumen drippings are automatically discharged when a predetermined full level thereof is attained; to provide such a method which is particularly well adapted for use with automatic egg processing machinery; to provide such a method which may be practiced with many existing egg processing machines; and to provide such a method which is efficient in operation and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged, top plan view of the pickup head.

FIG. 4 is a side elevational view of the collection apparatus.

FIG. 5 is an enlarged, vertical, cross-sectional view of the apparatus taken generally along line 5—5 in FIG. 4.

FIG. 6 is an enlarged, fragmentary, vertical, cross-sectional view of the apparatus with a float valve thereof shown in its open position.

FIG. 7 is an enlarged, fragmentary, vertical, cross-sectional view of the apparatus taken generally along line 7—7 in FIG. 5.

FIG. 8 is an enlarged, vertical, cross-sectional view of a discharge valve of the apparatus in its closed position.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
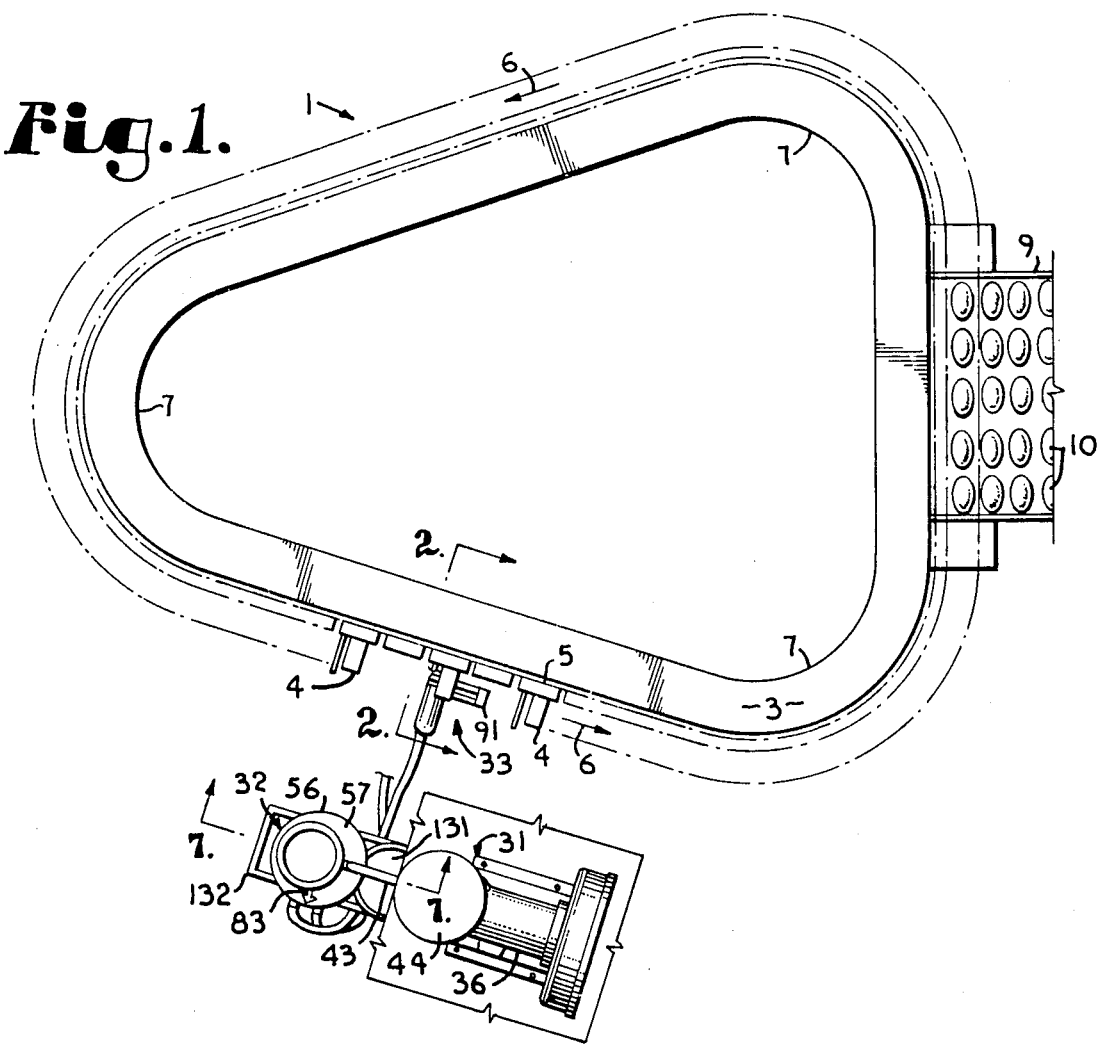
FIG. 1 is a top plan view of an egg processing machine including an albumen collection apparatus embodying the present invention.

Referring to the drawings in more detail, the reference numeral 1 generally designates an egg processing machine with an albumen collection apparatus 2 embodying the present invention. The machine 1 includes a conveyor 3 with multiple breaking and separating units 4 linked together to form an endless chain 5. The conveyor 3 defines a counterclockwise path of travel as indicated by the arrow 6 in FIG. 1 and has a somewhat triangular configuration with rounded corners 7 whereat the conveyor 3 is reeved on toothed sprockets (not shown) for driving and guiding the conveyor 3.

At the base of the triangular path, a feed conveyor 9 is provided for feeding eggs 10 in a predetermined orientation to the breaking and separating units 4. Properly oriented, the longitudinal axes of the eggs 10 extend parallel to the path of the conveyor 3. The eggs are received between upper and lower jaws 15, 16 of respective breaking and separating units 4. The eggs 10 are broken by pairs of knives 19 that swing upwardly under spring tension when each respective unit 4 reaches a predetermined breaking station on the conveyor path. The paired knives 19 protrude upwardly through gaps in the lower jaws 16 and thus penetrate the shells of the eggs 10 a distance sufficient to crack the shells along their bottom surfaces, but not so far as to break the yolks of most eggs.

As each unit 4 advances along the path of the conveyor 3, its knives 19 and the halves of its lower jaw 16 separate, thereby opening the egg 10 and separating its shell into a pair of shell parts 22 each comprising roughly one-half of the eggshell. The shell parts 22 are downwardly-open and disgorge the eggmeat comprising albumen and egg yolk.

The eggmeat contents are dropped from the separated shell parts 22 into a yolk cup 23 having an opening (not shown) and a notch (not shown) for permitting the albumen to overflow the yolk cup 23 into an albumen cup 28 located therebelow. Because the yolk is secured in a yolk sack which is generally not broken by the unit 4, it generally remains intact in the yolk cup 23 until discharged. However, the relatively high viscosity of the albumen causes albumen drippings or stringers 29 to form on the knives 19 and along the lowermost edges of the shell parts 22. Although some of the albumen generally transfers to the yolk cup 23 as stringers, various amounts of albumen are generally still dangling from the knives 19 and the shell parts 22 when a respective unit 4 reaches the apparatus 2, which is located along the last leg of the conveyor path, the base leg comprising the first.

Because of the highly viscous nature of the albumen, a large quantity is released when the shell parts 22 separate and generally decreasing quantity flows therefrom along the conveyor path. If the conveyor path were long enough, the albumen stringers 29 would probably dissipate to a point at which only an insignificant amount of albumen would remain. However, due to the relatively high operating rate (e.g. several hundred eggs per minute) of the processing machine 1, sufficient quantities of albumen are generally present in the form of stringers 29 to commercially justify the apparatus 2 for recovering them.

The collection apparatus 2 includes a collection container 31 with upper and lower portions 32, 33 separated by a baffle plate 34, a removable lid 35, a bottom 36 and a side wall 37. The lid 35 includes an exhaust opening 38 which receives an air exhaust coupling 39 mounted on the underside of the lid 35 by a coupling plate 40 and having a lower end comprising a valve seat 41. A clearance chamber 43 is mounted over the collection container 31 and is connected thereto by a lower air exhaust pipe 44 which terminates at the air exhaust coupling 39. Extending from the side of the clearance chamber 43 is an upper air exhaust pipe 45 which communicates with a vacuum pump 46 driven by an electric motor 47.

A float-type exhaust valve assembly 51 is located in the collection container 31 and selectively closes the valve seat 41 of the air exhaust coupling 39. The assembly 51 includes a mounting bracket 52 with a horizontal leg 53 mounted on the air exhaust coupling plate 40 and a vertical leg 54 depending downwardly therefrom. Upper and lower parallel, link arms 57, 58 include proximate ends 59, 60 pivotally connected to the mounting bracket vertical leg 54 and distal ends 61, 62. A valve bracket 65 includes a horizontal leg 66 with an elastomeric valve member 67 mounted thereon in alignment with the air exhaust coupling valve seat 41 and a vertical leg 68 depending downwardly therefrom and pivotally connected to the link arms 57, 58. A float bracket 73 includes upper and lower horizontal legs 74, 75 with vertically aligned upper and lower float stem receivers 76, 77 extending therethrough and a vertical leg 78 extending between the horizontal legs 74, 75 and pivotally connected to the link arm distal ends 61, 62.

The linkage of the exhaust valve assembly 51 described thus far is a parallelogram-type linkage wherein the vertical legs 54, 68 and 78 of brackets 52, 65 and 73 remain vertical and parallel to each other as they pivot with respect to the link arms 57, 58, which also remain parallel with respect to each other. The primary purpose of utilizing a parallelogram-type linkage is to maintain the float stem receivers in vertical alignment with each other as the link arms 57, 58 raise and lower.

The float stem receivers 76, 77 slidably receive a threaded float stem 81 with upper and lower ends 82, 83. Upper and lower nuts 84, 85 are threadably received on the float stem 81 in proximity to its upper end 82 above the float bracket upper horizontal leg 74 and below the float bracket lower horizontal leg 75. The nuts 84, 85 are spaced further apart on the float stem 81 than the spacing of the float bracket horizontal legs 74, 75 to provide a lost-motion type linkage. A cubical, hollow float 87 is mounted on the float stem lower end 83.

The baffle plate 34 includes an annular permiter 91 positioned in spaced relation inwardly from the container side wall 37 and a central opening 92 slidably receiving the float stem 81. The baffle plate 34 is connected to and suspended in spaced relation parallel to the lid 35 by support rods 93.

A discharge opening 96 extends through the container side wall 37 in proximity to its bottom 36 and communicates with a discharge pipe 97 in which a check valve 98 is mounted. The check valve 98 includes an elastomeric, flexible valve flap 99 adapted for sealingly engaging a valve seat 101 to occlude the discharge pipe 97.

An L-shaped, hollow pickup head 104 is mounted adjacent to the conveyor 3 and includes a distal section 105 extending in parallel, spaced relation with respect to the path of the conveyor 3 and a proximate section 106 extending transversely with respect to the path of the conveyor 3. The pickup head distal section 105 includes an upwardly open, longitudinally-extending slot 108 and a closed, blind end 109. The pickup head distal section 105 extends in the direction of travel of the conveyor 3 from the proximate section 106.

Figure 2:
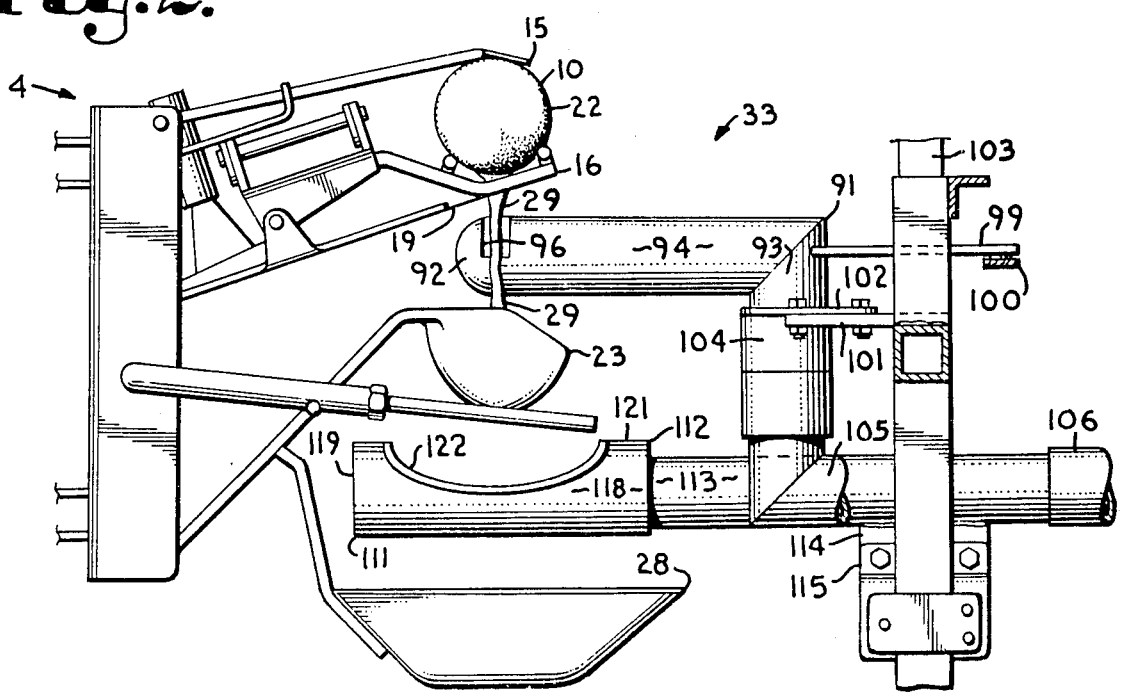
FIG. 2 is a fragmentary, enlarged, vertical cross-sectional view of the machine, particularly showing a breaking and separating unit and a pickup head of the collection apparatus.

The pickup head proximate section 106 is connected to a flexible vacuum hose 112 which in turn is sealingly placed over an intake pipe 113 which communicates with an intake opening 114 in the container side wall 37 centered slightly below the level of the baffle plate 34. The collection container 31, the clearance chamber 43, the vacuum pump 46 and the motor 47 are mounted on a stand 117 with an upper platform 118 receiving the clearance chamber 43, the vacuum pump 46 and the motor 47. The stand 117 includes a lower platform 119 which supports the collection container 31. The pickup head 104 is preferably mounted on a mounting structure (not shown) connected to the support structure for the conveyor 3 so that the pickup head slot 108 is relatively precisely positioned with respect to the travel path of the conveyor 3. Preferably, the pickup head 104 is positioned so that the lower jaws 16 of the breaking and separating units 4 pass over its distal section 105 and the yolk cups 23 pass thereunder. Preferably, the slot 108 is aligned with the path of travel of the albumen stringers 29, as shown in FIG. 2.

In operation, the container 31 receives albumen 121 to a full level 122, at which point the contents of the container 31 discharge and the cycle repeats. With the albumen 121 below the full level 122 as shown in FIG. 6, the lower float stem nut 84 rests on the baffle plate 34; the arms 57, 58 slope downwardly from their proximate ends 59, 60 to their distal ends 61, 62; and the valve member 67 is positioned in spaced relation from the air exhaust coupling valve seat 41 whereby the exhaust valve assembly 51 is open. The vacuum pump 46 draws a partial vacuum within the collection container 31 whereby the discharge valve flap 99 is held in its closed position against the seat 101 as shown in FIG. 8.

Air and albumen stringers 29 enter the pickup head slot 108 and are drawn through the pickup head 104, the vacuum hose 112, the intake pipe 113 and the intake opening 114. Upon entering the collection container 31, the air is drawn to the exhaust coupling 139 for discharge from the vacuum pump 46 and the albumen 121 falls into the collection container 31. The baffle plate 34 prevents air turbulence between the intake pipe 113 and the exhaust coupling 39 from having much effect on the albumen 121, which might otherwise be whipped into a froth and possibly even drawn out through the exhaust coupling 39.

Within the clearance chamber 43, the air velocity is less than in the adjoining air exhaust pipes 44, 45 and stray albumen particles tend to fall out of the exhaust air stream within the clearance chamber 43 for return to the collection container 31 via the lower air exhaust pipe 44. Hence, very little albumen is discharged from the vacuum pump 46 and most of that which enters the pickup head 104 is collected in the container 31.

The rising level of the collected albumen 121 eventually makes the float 87 buoyant and slides the valve stem within the float stem receivers 76, 77 until the lower nut 84 engages the lower horizontal bracket leg 75. As the float 87 continues to rise, the arms 57 are raised until the albumen full level 122 is attained whereupon the valve member 67 engages the air exhaust coupling valve seat 41 and closes the exhaust valve assembly 51. The vacuum pressure within the container 31 that retains the check valve 98 closed is thus released and the albumen 121 is discharged through the discharge pipe 97.

The float 87 drops immediately with the albumen level, but because of its lost motion linkage feature, the exhaust valve assembly 51 remains closed during the time interval required for the float 87 to drop a distance equal to that by which the spacing of the float stem nuts 84, 85 exceeds the spacing of the float bracket horizontal legs 74, 75. A slight delay is thus introduced into the system whereby the exhaust valve assembly 51 remains closed for a short time longer than it would if no lost motion linkage were present. Without this automatic delay feature, the exhaust valve assembly 51 would reopen almost immediately after it closed and the vacuum pump 46 would resume evacuation of the collection container 31, which could impede the discharge of the albumen 121. The time delay between closing and opening the exhaust valve assembly 51 can be lengthened by increasing the distance between the float stem nuts 84, 85 and vice versa. Also, the albumen full level 122 can be raised within the collection container 31 by lowering the lower nut 85 on the float stem 81.

The foregoing operational description of the apparatus in conjunction with the egg processing machine 1 comprises a disclosure of the method of the present invention.

In addition to the pickup head 104 shown, additional pickup heads could be placed at appropriate locations with respect to the path of the conveyor 3. For example, a pickup head could be placed between the yolk cup 23 and the albumen cup 28 to collect stringers dangling from the former. Although the pickup head 104 is placed in a fixed position with respect to the conveyor 3, the rest of the collecting apparatus 2, i.e. those portions mounted on the stand 117, can be positioned at practically any desired location within a short distance of the pickup head 104.

After each breaking and separating unit 4 passes the pickup head 104, its yolk and albumen cups 23, 28 are released to pivot outwardly and downwardly whereby their respective contents are deposited in separate collection troughs or containers. The unit 4 is then thoroughly cleaned at a washing station and is reset for receiving another egg 10 as it passes the feed conveyor 9. The albumen 121 collected in the container 31 can be combined with the albumen collected from the albumen cups 28 of the breaking and separating units 4.

It is to be understood that while certain forms of the present invention have been illustrated and described herein, it is not to be limited to the specific forms or arrangement of parts described and shown.

What is claimed and desired to be secured by Letters Patent is as follows:

1. A method of collecting albumen from eggs, which comprises the steps of:
    (a) depositing an egg on a conveyor-mounted egg breaking and separating unit movable along a path;
    (b) cracking the shell of said egg;
    (c) separating said eggshell into two parts with albumen drippings suspended from at least one of said eggshell parts;
    (d) depositing most of the albumen and yolk contents of said egg into a yolk cup;
    (e) straining said albumen and yolk contents whereby said yolk is retained in said yolk cup and most of said albumen overflows into an albumen cup;
    (f) providing a vacuum pickup head including an inlet opening in the path of said breaking and separating unit;
    (g) moving said braking and separating unit past said vacuum pickup head whereby said eggshell parts pass over said vacuum pickup head and said yolk cup passes thereunder;
    (h) creating a partial vacuum within an albumen collection container connected to said pickup head; and
    (i) drawing air and albumen drippings into said pickup head opening and then into said container.

2. The method according to claim 1, which includes the additional step of:
    (a) automatically dispensing the contents of said container when said albumen reaches a predetermined level therein.

3. The method according to claim 2, which includes the additional step of:
    (a) closing an exhaust opening when said albumen reaches said predetermined level in said container.

4. The method according to claim 3, which includes the additional step of:
    (a) opening said exhaust opening when said albumen level in said container drops.

5. The method according to claim 4, which includes the additional step of:
    (a) delaying the opening of said exhaust valve when said albumen level in said container drops.

6. The method according to claim 1, which includes the additional steps of:
    (a) providing a second vacuum pickup head with an opening in the path of said breaking and separating unit;
    (b) moving said breaking and separating unit past said second vacuum pickup head whereby said yolk cup passes thereover and said albumen cup passes thereunder; and
    (c) drawing air and albumen drippings into said second pickup head opening and then into said container.

* * * * *